Sept. 6, 1955     O. C. JONES ET AL     2,717,198
AMMONIA-PHOSPHORUS PENTOXIDE REACTION
PRODUCTS AND METHOD OF PRODUCING SAME
Filed Oct. 25, 1951
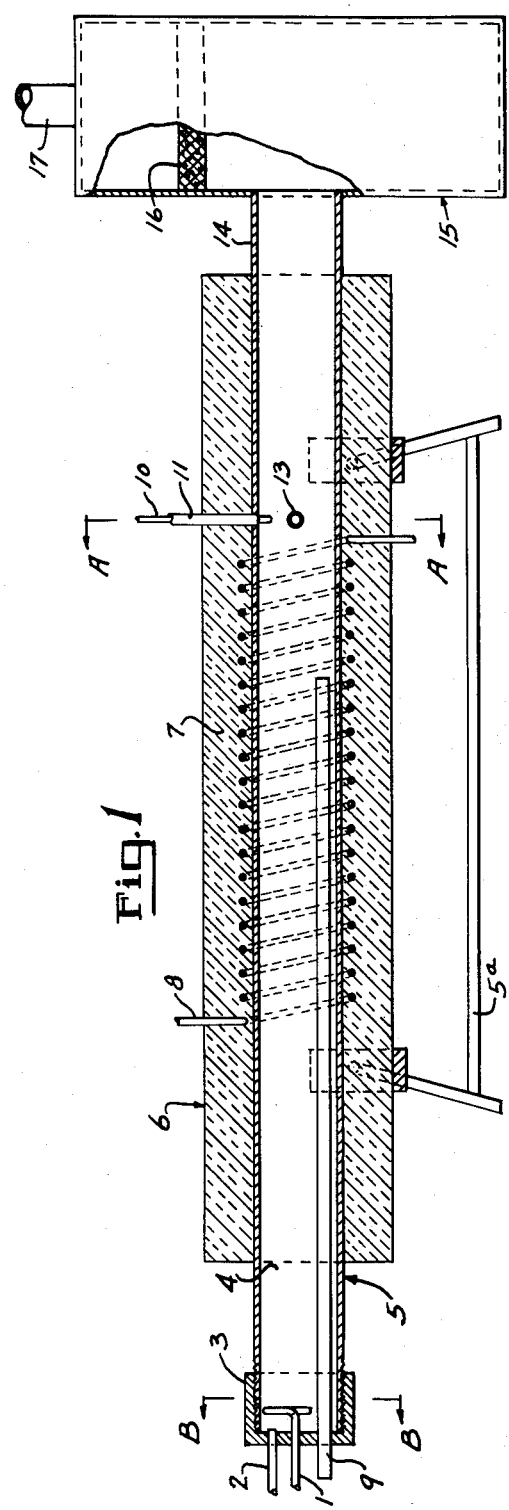
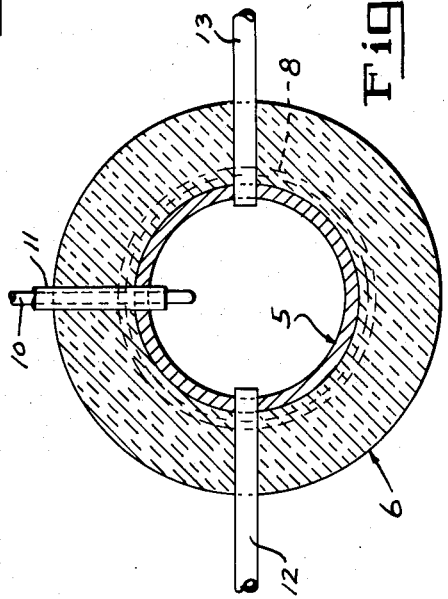
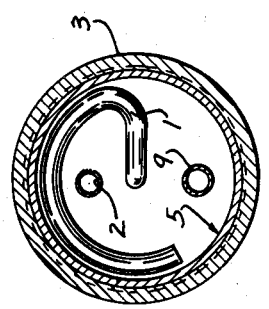
OTHA C. JONES
PETER G. ARVAN
INVENTORS
BY Elmer P. Rucker
ATTORNEY

United States Patent Office 2,717,198
Patented Sept. 6, 1955

2,717,198

AMMONIA-PHOSPHORUS PENTOXIDE REACTION PRODUCTS AND METHOD OF PRODUCING SAME

Otha C. Jones, Campbell, Calif., and Peter G. Arvan, Anniston, Ala., assignors to Monsanto Chemical Company, St. Louis, Mo., a corporation of Delaware Application October 25, 1951, Serial No. 253,112

8 Claims. (Cl. 23—106)

This invention relates to a novel and economically feasible method of making ammonia-phosphorus pentoxide complexes by the reaction of substantially anhydrous ammonia and phosphorus pentoxide.

An object of the present invention is to provide a continuous method of making ammonia-phosphorus pentoxide complexes from substantially anhydrous gaseous ammonia and phosphorus pentoxide vapor or gaseous products containing same.

An additional object is to provide a method of producing ammonia-phosphorus pentoxide complexes in which the reaction conditions and quality of the product may be readily controlled.

Another object is to provide a method of producing the above products in which the reaction conditions and products are readily reproducible and predictable and therefore translation from a plant of a given productive capacity to one of a substantially different capacity can be readily made without extensive experimentation.

A further object is to provide a method of producing the above products, which is adapted for large volume production and requires only relatively simple and inexpensive equipment as compared with that of the prior art.

A still further object is to provide ammonia-phosphorus pentoxide complexes which are eminently suitable for use as fertilizers and as water softening and flameproofing compounds.

Other objects and advantages will be apparent to those skilled in the art as the description of the invention proceeds.

Heretofore, ammonia-phosphorus pentoxide complexes have been prepared by several different methods which are subject to a number of disadvantages, and, therefore, are commercially unattractive.

For example, the above products have been prepared by reacting gaseous ammonia with solid phosphorus pentoxide, but this method of approach is impractical since an impervious coating is formed on the surface of the pentoxide which prevents further reaction with ammonia.

Another method of producing the above products involves the reaction of liquid ammonia with phosphorus pentoxide, but this technique is objectionable since it involves the use of low temperatures which require refrigerating equipment or solid carbon dioxide-solvent mixtures. Moreover, it is subject to the further disadvantage of requiring large and expensive equipment for large volume production.

An additional method of manufacturing the above products involves the reaction of gaseous or liquid ammonia with a suspension of phosphorus pentoxide in an organic solvent for the reaction product. However, this method of approach is unsatisfactory since the resulting products are contaminated with from 10% to 20% by weight of the solvent which apparently is present in the ammonia-phosphorus pentoxide complex in the form of a nitrogenous organic reaction product. This nitrogenous organic product can be removed with considerable difficulty but only after partial decomposition of the desired product with liberation of ammonia. Finally, this method is subject to the further drawback of requiring agitators and of being unsuitable for operation on a large scale without resorting to the use of numerous large and expensive pieces of equipment.

We have developed a novel and commercially feasible method of continuously producing ammonia-phosphorus pentoxide complexes, which has none of the disadvantages and objectionable features mentioned above.

In accordance with this method, elemental phosphorus is ignited in an excess of dry air and the combustion products immediately reacted with substantially anhydrous gaseous ammonia at a temperature within the range of about 240° C. to about 725° C. to form an ammonia-phosphorus pentoxide intermediate. This intermediate is subjected in the presence of ammonia to a temperature of from about 20° C. to about 300° C. to form the final ammonia-phosphorus pentoxide complex, the temperature employed being dependent upon the ultimate properties desired in the product. The final ammonia-phosphorus pentoxide complex produced in the above may be divided into two products, namely, a highly soluble complex and a moderately to substantially insoluble complex. The first of these products has an ammonia to phosphorus pentoxide molar ratio of from about 2.2/1 to about 3.25/1 and is produced by subjecting to a temperature of about 20° C. to about 300° C. the gaseous phase ammonia-phosphorus pentoxide intermediate produced at a temperature of about 240° C. to about 500° C. The second product has an ammonia to phosphorus pentoxide molar ratio of about 2.20/1 to about 3.2/1 and is prepared by subjecting to a temperature of about 20° C. to about 300° C. the gaseous phase ammonia-phosphorus pentoxide intermediate formed at a temperature of about 500° C. to about 725° C.

For a more complete understanding of the present invention reference is made to the accompanying drawings in which:

Figure 1 is a vertical sectional view of apparatus suitable for carrying out the vapor phase reaction between ammonia and phosphorus pentoxide in accordance with the instant invention.

Figure 2 is an enlarged cross sectional view taken on line A—A of Figure 1.

Figure 3 is an enlarged cross sectional view taken on line B—B of Figure 1.

Referring more specifically to the above drawings, reference characters 1 and 2 represent inlet lines supported by pipe cap 3 for introducing air and molten phosphorus into the combustion chamber 4 of the stainless steel tube 5. As shown in Figure 3, the end of the air inlet tube 1 is curved at a right angle to its longitudinal axis so that the air will be injected into the combustion chamber tangentially. This sets up a swirling motion and consequently better mixing of the air with phosphorus vapor and more efficient combustion are obtained.

The stainless steel tube 5 has a diameter and length of 2 and 50 inches respectively, and is provided throughout the greater part of its length with suitable insulation 6. The intermediate section 7 of this insulation is equipped with electrical windings 8 for the purpose of further heating the phosphorus combustion products passing through tube 5. The insulated stainless steel tube 5 is supported by a cradle 5a or any other suitable means.

The stainless steel tube 5 is further provided with a thermocouple well 9 carrying a thermocouple (not shown) for measuring the temperature of the combustion products at the point indicated, and an additional thermocouple 10 for indicating the temperature of the above products at the point of the ammonia introduction.

The thermocouple well 9 is supported by pipe cap 3 and the thermocouple 10 is introduced into the stainless steel tube 5 by means of line 11.

Reference characters 12 and 13 represent lines for introducing ammonia gas into the stainless steel tube 5 for reaction with the hot phosphorus combustion products.

The stainless steel tube 5 is connected by means of a section 14 with a collection chamber 15 for recovering the ammonia-phosphorus pentoxide reaction products. This chamber is provided with a filter 16 which permits traces of water vapor, air and unreacted ammonia to pass out of the system by line 17, and prevents the finely divided solid reaction product from being entrained by the above gaseous product.

In the practice of the instant invention in the above apparatus, molten phosphorus and an excess of dry air are introduced at a controlled rate into the combustion chamber where the phosphorus is ignited to produce a gaseous product including phosphorus pentoxide vapor. This product flows through the stainless steel pipe and during its travel therethrough is heated to a temperature within the range of about 240° C. to about 725° C. and then is immediately reacted with substantially anhydrous ammonia gas which is introduced by way of lines 12 and 13. The resulting reaction product is passed through the air-cooled zone 14 where it is rapidly cooled to separate an ammonia-phosphorus pentoxide intermediate which collects in chamber 15 as a free flowing white powder. The gaseous residue which includes excess air, unreacted ammonia and water formed by the ignition of ammonia is conducted through the filter 16 and then discharged from the system by way of line 17.

The ammonia-phosphorus pentoxide intermediates produced in the above manner at a temperature of about 240° C. to about 500° C. and at a temperature of about 500° C. to about 725° C. are subjected to a temperature of about 20° C. to about 300° C. to yield two products, namely, a highly soluble ammonia-phosphorus pentoxide complex and a moderately to substantially insoluble ammonia-phosphorus pentoxide complex. These products have many valuable properties which render them commercially attractive.

The practice of the instant invention is further illustrated by the following examples.

*Example I*

Elemental molten phosphorus and an excess of dry air were supplied for a period of three hours to the above described apparatus and ignited to produce a gaseous product including phosphorus pentoxide vapor. This product was continuously reacted with substantially anhydrous gaseous ammonia which was charged at a rate providing an ammonia to phosphorus pentoxide molar ratio of about 2.70/1, the reaction taking place at a temperature of from 340° C. to 350° C.

The dry air used in the phosphorus combustion operation was introduced in an amount corresponding to 100% in excess of that required to convert the phosphorus to the corresponding pentoxide. The gaseous ammonia was supplied in an amount corresponding to 7.6% in excess of that required to yield an ammonia-phosphorus pentoxide reaction product having these materials combined in an $NH_3:P_2O_5$ molar ratio of about 2.5/1.

The product of the above reaction was condensed in the collector as a free flowing white powder in an amount corresponding to 95% of theory. The gaseous residue including water vapor, air and unreacted ammonia was passed through the filter 16 and then discharged from the system.

The product which condensed in the collector had the following properties:

| | |
|---|---:|
| Per cent $NH_3$ | 21.93 |
| Per cent $P_2O_5$ | 73.28 |
| $NH_3/P_2O_5$ | 2.5/1 |
| pH in 1% sol | 6.85 |
| Hygroscopicity at 75% relative humidity at 30° C. (per cent by weight) | 37.8 |
| Solubility at 30° C. (grams/100 grams of water) | 19.0 |

Samples of the condensed product were subjected to a temperature of 100° C. for 1 hour and to a temperature of 25° C. for 1 and 3 hours, respectively, these treatments taking place with the product in contact with 100% by volume of ammonia. Products having the following properties were obtained.

| Properties | Treated Products | | |
|---|---|---|---|
| | 1 Hour at 100° C. | 1 Hour at 25° C. | 3 Hours at 25° C. |
| Present $NH_3$ | 26.05 | 25.08 | 26.21 |
| Percent $P_2O_5$ | 70.70 | 70.60 | 70.50 |
| $NH_3/P_2O_5$ | 3.08/1 | 2.95/1 | 3.11/1 |
| pH in 1% solution | 7.7 | 7.5 | 7.6 |
| Hygroscopicity at 75% R. H. at 30° C. (Percent By Weight) | 38.4 | Ca. 35 | Ca. 35 |
| Solubility at 30° C. (Grams/100 grams of $H_2O$) | >70.0 | >40.0 | >40.0 |
| CRT | 6.5 | | |

*Example II*

The gaseous phase procedure described in Example I was repeated using the following operating conditions:

| | |
|---|---|
| Time of run | 2 hours |
| Reaction temperature range | 535° C.–675° C. |
| Average reaction temperature | 610° C. |
| Per cent excess ammonia gas | 18.7 |
| Per cent excess air | 77.0 |
| $NH_3/P_2O_5$ molar ratio | 3.08/1 |

A free flowing white product was obtained in a yield corresponding to 66.7% of theory, which product possessed the following properties:

| | |
|---|---:|
| Per cent $NH_3$ | 22.44 |
| Per cent $P_2O_5$ | 75.57 |
| $NH_3/P_2O_5$ molar ratio | 2.48/1 |
| pH in 1% solution | 7.4 |
| Hygroscopicity at 75% R. H. at 30° C. (per cent by weight) | 41.2 |
| Solubility at 30° C. (grams/100 grams of $H_2O$) | 10–15 |

The product of the above reaction was heated at 250° C.–265° C. in a closed calciner for 1 hour in contact with 100% by volume of ammonia to yield a product having the following properties:

| | |
|---|---:|
| Per cent $NH_3$ | 20.46 |
| Per cent $P_2O_5$ | 75.88 |
| $NH_3/P_2O_5$ molar ratio | 2.25/1 |
| pH in 1% solution | 6.7 |
| Hygroscopicity at 75% R. H. at 30° C. (per cent by weight) | 6.5 |
| Solubility at 30° C. (grams/100 grams of $H_2O$) | 0.58 |

*Example III*

The gaseous phase procedure described in Example I was followed except that the following operating conditions were employed:

| | |
|---|---|
| Time of run | 1 hour. |
| Reaction temperature range | 590° C.–725° C. |
| Average reaction temperature | 690° C. |
| Per cent excess ammonia gas | 3. |
| Per cent excess air | 100. |
| $NH_3/P_2O_5$ molar ratio | 2.66/1. |

As a result of the above run, a free flowing white product having the following properties was obtained in a yield corresponding to 78.2% of theory:

| | |
|---|---|
| Per cent $NH_3$ | 20.81 |
| Per cent $P_2O_5$ | 76.85 |
| $NH_3/P_2O_5$ molar ratio | 2.27/1 |
| pH in 1% solution | 5.3 |
| Hygroscopicity at 75% R. H. at 30° C. (per cent by weight) | 28.7 |
| Solubility at 30° C. (grams/100 grams of $H_2O$) | 10–15 |

The product obtained in the above described manner was calcined in a closed calciner at 250° C. for 1 hour with the charge exposed to 100% by volume of ammonia. A product having the following properties was obtained.

| | |
|---|---|
| Per cent $NH_3$ | 21.42 |
| Per cent $P_2O_5$ | 76.42 |
| $NH_3/P_2O_5$ molar ratio | 2.35/1 |
| pH in 1% solution | 6.3 |
| Hygroscopicity at 75% R. H. at 30° C. (per cent by weight) | 7.8 |
| Solubility at 30° C. (grams/100 grams of $H_2O$) | 1–2 |

The reaction conditions used in the above examples may be varied widely without departing from the principles of the invention.

For example, the gaseous phase reaction between substantially anhydrous ammonia and phosphorus pentoxide may be carried out at a temperature substantially in the range of about 240° C. to about 725° C. However, somewhat higher temperatures avoiding substantial decomposition of the desired ammonia-phosphorus pentoxide complex with the formation of metaphosphoric acid may be employed if desired.

The sojourn time of the reactants and reaction product from the point of ammonia introduction to the point where the excess air and ammonia pass through the filter is from about 3 to 5 seconds or less.

The reaction product must be subjected to quick cooling in order to obtain it in a dry free flowing condition. Quick cooling within the meaning of the present specification means that the reaction product must be cooled to a temperature below 200° C. within the above sojourn time. The above objective is achieved by means of air, water or any other suitable heat exchanging media, it being understood that the reactor, the collector and the connecting tube are composed of material which is suitable, when employed in connection with the selected media, for effecting the required cooling rate. This cooling is, of course, supplemented by the excess air and ammonia used in carrying out the phosphorus combustion and ammonia—$P_2O_5$ reactions, respectively.

In executing the gaseous phase reaction, the air is employed in an amount substantially in excess of that required to oxidize the phosphorus to phosphorus pentoxide. In general from about 20% to about 300% excess of air is used and within this range about 75% to about 100% excess air is preferred. The air serves the purpose of oxidizing the phosphorus to $P_2O_5$, of aiding in the quick cooling of the gaseous reaction product and of acting as a carrier for the $P_2O_5$ vapor.

The gaseous ammonia may be employed in an amount substantially in the range of about 100% to about 120% of the theoretical amount required to yield a product having a given $NH_3/P_2O_5$ molar ratio and within these limits about 5% to 15% excess is preferred. In addition to being a reactant, the excess gaseous ammonia facilitates quick cooling by removing heat from the system.

The products obtained by the above reaction progressively decrease in water solubility as the reaction temperature is increased and for convenience of description, they may be classified as a low temperature and a high temperature form.

In the production of the low temperature form, the reaction may be carried out at a temperature of about 240° C. to about 500° C. However, in practice it is preferred to execute the reaction at a temperature within the range of from about 325° C. to about 350° C. since by operating in this manner the resulting product is obtained in a yield corresponding to about 95% of theory. In carrying out the foregoing reaction, the ammonia and phosphorus pentoxide are supplied to the reaction zone at rates providing these reactants in a $NH_3/P_2O_5$ molar ratio within the range of about 2.2/1 or about 3.2/1. Stated in a different manner, the above reactants are supplied to the reaction zone in the proportions required to yield a product having a molar ratio of $NH_3$ to $P_2O_5$ of from about 2.1/1 to about 2.7/1.

The low temperature soluble ammonia-phosphorus pentoxide intermediate is subjected for 1 to 3 hours to a temperature of from about 20° C. to about 300° C. and preferably to a temperature of about 100° C. while in contact with an atmosphere of ammonia. This results in the production of a product of substantially increased solubility in water having a molar ratio of ammonia to phosphorus pentoxide in the range of about 2.20/1 to about 3.25/1.

The low temperature ammonia-phosphorus pentoxide intermediate is preferably subjected to a temperature of about 20° C. to about 300° C. while this product is in contact with 100% by volume of gaseous ammonia. However, mixtures of ammonia gas with air, nitrogen or another inert gas may be employed if desired, but they are less desirable since due to the diluting effect of the inert gases, the treatment must be carried out for a longer period of time in order to effect the same amount of ammonia absorption. The purposes of this treatment are to produce condensation products of ammonia and phosphorus pentoxide of higher average molecular weight, to increase the ammonia content of the intermediate and to enhance its water solubility and calcium sequestering power.

In preparing the high temperature form, the gaseous phase reaction is executed at a temperature of from about 500° C. to about 725° C. and preferably at a temperature of about 675° C. to about 700° C. The reactants are charged to the reaction zone at rates supplying ammonia and phosphorus pentoxide in a molar ratio in the range of about 2.2/1 to about 3.2/1. Stated differently, the above reactants are charged to the reaction zone in the proportions required to yield a product having an $NH_3/P_2O_5$ molar ratio of from about 2.1/1 to about 2.7/1.

The high temperature ammonia-phosphorus pentoxide complex is subjected to a temperature of from 20° C. to 300° C. for about 1 to about 3 hours while in contact with gaseous ammonia. This results in the production of a relatively insoluble product having an $NH_3/P_2O_5$ molar ratio of from about 2.2/1 to about 3.2/1 and whose solubility decreases with increase in ammonia treatment temperature, reaching a minimum solubility at 250° C. to about 300° C.

If the high temperature ammonia—$P_2O_5$ intermediate is produced at a temperature within the range of about 500° C. to about 600° C., the treatment with ammonia is preferably executed at temperatures below about 120° C. as otherwise the product softens, becomes sticky and adheres to the walls of the calciner. However, this difficulty is overcome by heating the intermediate to a temperature of from about 175° C. to about 225° C. for about 10 to about 20 minutes, screening the product to break up the cake formed, and then completing the calcination in an ammonia atmosphere at about 250° C. for 1 hour.

If the high temperature ammonia—$P_2O_5$ intermediate is prepared at a temperature within the range of about 600° C. to about 725° C., the treatment with ammonia is preferably carried out at a temperature of about 250° C. but may be executed at any temperature within the range of about 20° C. to about 300° C.

The high temperature ammonia-phosphorus pentoxide intermediate is preferably subjected to a temperature of about 20° C. to about 300° C. while this material is in contact with 100% by volume of ammonia gas. As in the case of the low temperature intermediate, mixtures of ammonia with air, nitrogen or another inert gas may be used in place of straight ammonia. The purposes of the above treatment are to produce condensation products of ammonia and phosphorus pentoxide of higher average molecular weight without loss of ammonia or without substantial loss of ammonia and to decrease the solubility of the intermediate in water.

The products of the gaseous phase reaction are extremely valuable as water softeners since they have the property of holding calcium and magnesium ions of hard waters in solution or colloidal suspension in the presence of fatty acid soap solutions. However, their capacity for performing the above function decreases as their temperature of formation increases since an increase in their temperature of formation results in a decrease in their water solubility. The foregoing products are also useful as fertilizers and as flameproofing agents for cellulose materials and textile fabrics such as cotton duck, cotton muslin, viscose rayon, silk, linen or wool.

The products obtained by subjecting the low temperature gaseous phase ammonia-phosphorus pentoxide reaction products to a temperature of about 20° C. to about 300° C. while in contact with an atmosphere of ammonia find use in all of the above applications, but are more useful as water softeners than the untreated low temperature products since they are much more soluble.

The products obtained by subjecting the high temperature gaseous phase ammonia-phosphorus pentoxide reaction products to a temperature of about 20° C. to about 300° C. while in contact with an atmosphere of ammonia are useful in all of the above applications, but are more suitable for fertilizer and flameproofing uses since they are more insoluble. Among these products, the ammonia—$P_2O_5$ complex produced by reacting ammonia and $P_2O_5$ at about 675° C. to about 700° C. and then subjecting the resulting product for 1 hour to a temperature of 100° C. has outstanding water resistant properties which render it eminently suitable for use as a flameproofing agent and a specialty fertilizer. In applying this flameproofing material to cellulose and textile materials, it may be applied as such or formed in situ, that is, by applying the intermediate and then subjecting the applied material to the above temperature while in contact with an atmosphere of ammonia.

The CRT values of the products of the instant invention were determined by preparing a standard calcium solution containing 0.1 mg. of calcium per milliliter and also 0.5 milliliter of a standard soap solution (1 milliliter=1 mg. $CaCO_3$), and then titrating with 8 grams of the ammonia-phosphorus pentoxide reaction product contained in 1 liter of solution. This ammonia-phosphorus pentoxide solution is added in 2 mil. increments with shaking until suds are formed which are stable for five minutes and the volume of solution required to produce this result is recorded as the CRT value.

Where the expression "dry air" is employed in the specification and claims, it is to be understood that this means that the air is substantially free of moisture at the temperature of its use.

Reference is made to copending application Serial No. 194,278, filed November 6, 1950 in the name of Otha C. Jones, wherein is claimed the gaseous phase method of making ammonia metaphosphate by the reaction of water, phosphorus pentoxide and ammonia. This copending application is assigned to the same assignee as the instant application.

It is to be understood that the invention is not confined to the specific embodiments described above but includes all such variations, modifications, and equivalents as fall within the scope of the appended claims.

What we claim is:

1. The method of producing valuable products, which comprises supplying dry air and elemental phosphorus to a combustion chamber where it is ignited to form phosphorus pentoxide vapor, introducing substantially anhydrous gaseous ammonia into said vapor to effect a reaction with said phosphorus pentoxide vapor, cooling the resulting reaction product in a period of from 3 to 5 seconds to a temperature below about 200° C., and then subjecting the resulting product, while in contact with an atmosphere consisting of 100% by volume of ammonia gas, to a temperature within the range of about 20° C. to about 300° C., said initial reactants being employed in the proportions yielding a product having an ammonia to phosphorus pentoxide molar ratio of about 2.2/1 to about 3.25/1 and said initial reaction being carried out at a temperature substantially in the range of about 240° C. to about 725° C.

2. The method of producing valuable products, which comprises supplying dry air and elemental phosphorus to a combustion chamber where it is ignited to form phosphorus pentoxide vapor, introducing substantially anhydrous gaseous ammonia into said vapor to effect a reaction with said phosphorus pentoxide vapor, cooling the resulting reaction product in a period up to about 5 seconds to a temperature below about 200° C., and then subjecting the resulting product, while in contact with an atmosphere consisting of 100% by volume of ammonia gas, to a temperature within the range of about 20° C. to about 300° C., said initial reactants being employed in the proportions yielding a product having an ammonia to phosphorus pentoxide molar ratio substantially in the range of about 2.2/1 to about 3.25/1, said initial reaction being carried out at a temperature in the range of about 240° C. to about 725° C. and said air being employed in an amount equivalent to about 20% to about 30% in excess of that required to oxidize the elemental phosphorus to phosphorus pentoxide.

3. The method of producing valuable products, which comprises reacting substantially anhydrous gaseous ammonia with phosphorus pentoxide in the gaseous phase and at a temperature substantially in the range of about 240° C. to about 725° C., cooling the reaction product in a period up to about 5 seconds to a temperature below about 200° C. and then subjecting the resulting product, while in contact with an atmosphere consisting essentially of ammonia gas, to a temperature within the range of about 20° C. to about 300° C. for a period of about 1 to about 3 hours, said initial reactants being employed in the proportions yielding a product having an ammonia to phosphorus pentoxide molar ratio substantially in the range of about 2.2/1 to about 3.25/1.

4. The method of producing valuable products, which comprises reacting substantially anhydrous gaseous ammonia with phosphorus pentoxide in the gaseous phase and at a temperature substantially in the range of about 240° C. to about 725° C., cooling the reaction product in a period up to about 5 seconds to a temperature below about 200° C., and then subjecting the resulting product, while in contact with an atmosphere consisting of 100% by volume of ammonia gas, to a temperature of about 100° C. for a period of about 1 hour, said initial reactants being employed in the proportions yielding a product having an ammonia to phosphorus pentoxide molar ratio substantially in the range of about 2.2/1 to about 3.25/1.

5. The method of producing valuable products, which comprises reacting substantially anhydrous gaseous ammonia with phosphorus pentoxide in the gaseous phase and at a temperature substantially in the range of about 240° C. to about 500° C., cooling the reaction product in a period up to about 5 seconds to a temperature below about 200° C., and then subjecting the resulting product, which in contact with an atmosphere consisting essentially of ammonia gas, to a temperature within the range of about 20° C. to about 300° C. for a period of time sufficient to yield a product having an ammonia to phosphorus pentoxide molar ratio in the range of about 2.2/1 to about 3.25/1, said initial reactants being employed in the proportions yielding a product having an ammonia to phosphorus pentoxide molar ratio of about 2.1/1 to about 2.7/1.

6. The method of producing valuable products, which comprises reacting substantially anhydrous gaseous ammonia with phosphorus pentoxide in the gaseous phase and at a temperature substantially in the range of about 500° C. to about 725° C., cooling the reaction product in a period up to about 5 seconds to a temperature below about 200° C., and then subjecting the resulting product, while in contact with an atmosphere consisting of 100% by volume of ammonia gas, to a temperature within the range of about 20° C. to about 300° C. for a period of about 1 to about 3 hours, said initial reactants being employed in the proportions yielding a product having an ammonia to phosphorus pentoxide molar ratio of about 2.2/1 to about 3.2/1.

7. The method of producing valuable products, which comprises reacting substantially anhydrous gaseous ammonia with phosphorus pentoxide in the gaseous phase and at a temperature of about 500° C. to about 600° C., cooling the reaction product in a period up to about 5 seconds to a temperature below about 200° C. and then subjecting the resulting product for about 1 to about 3 hours to a temperature between about 20° C. and about 120° C. while in contact with an atmosphere consisting of 100% by volume of ammonia gas.

8. The method of producing valuable products, which comprises reacting substantially anhydrous gaseous ammonia with phosphorus pentoxide in the vapor phase and at a temperature of about 600° C. to about 725° C., cooling the reaction product in a period up to about 5 seconds to a temperature below about 200° C. and then subjecting the resulting product to a temperature of about 20° C. to about 300° C. for about 1 to about 3 hours while in contact with an atmosphere consisting of 100% by volume of ammonia gas.

References Cited in the file of this patent

UNITED STATES PATENTS

| Number | Name | Date |
|---|---|---|
| 1,194,077 | Ross et al. | Aug. 8, 1916 |
| 1,514,912 | Klugh | Nov. 11, 1924 |
| 2,122,122 | Woodstock | June 28, 1938 |
| 2,561,415 | Rice | July 24, 1951 |